April 21, 1964     W. L. WATSON     3,129,985
SEALS FOR BALL AND ROLLER BEARINGS
Filed Oct. 18, 1962     2 Sheets-Sheet 1
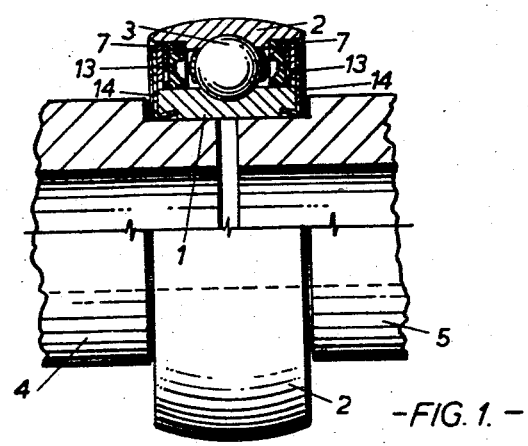
-FIG. 1.-
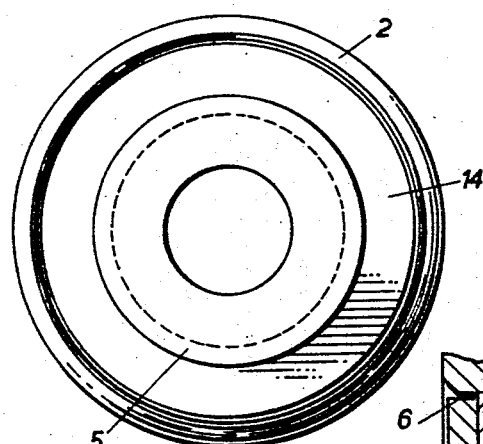
-FIG. 2.-
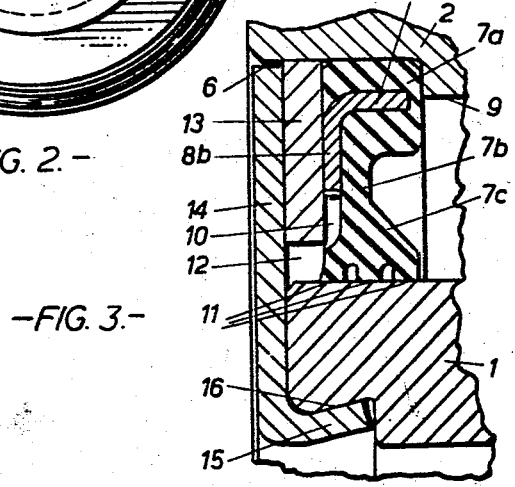
-FIG. 3.-
INVENTOR:
WILLIAM LEWIS WATSON
BY
Abraham A. Saffitz
ATTORNEY April 21, 1964 W. L. WATSON 3,129,985
SEALS FOR BALL AND ROLLER BEARINGS
Filed Oct. 18, 1962 2 Sheets-Sheet 2
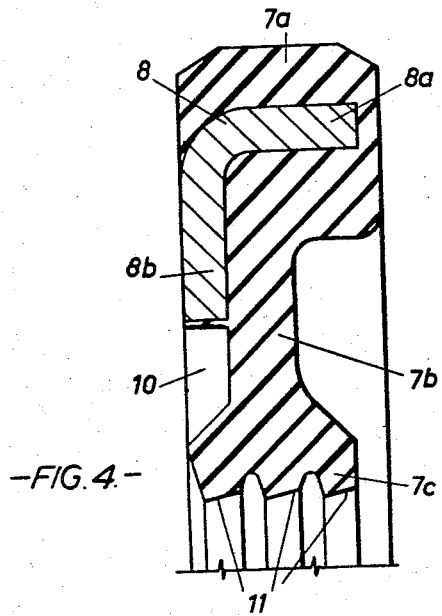
-FIG.4.-
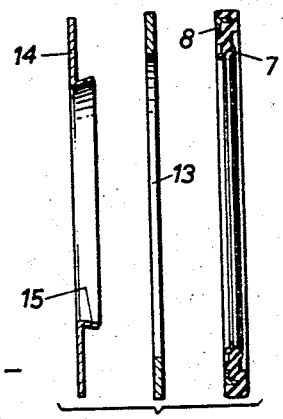
-FIG.5.-
INVENTOR:
WILLIM LEWIS WATSON
BY
Abraham A. Saffitz
ATTORNEY

United States Patent Office 3,129,985
Patented Apr. 21, 1964

3,129,985
SEALS FOR BALL AND ROLLER BEARINGS
William L. Watson, Pontefract, England, assignor to Pollard Bearings Limited, Knottingley, England
Filed Oct. 18, 1962, Ser. No. 231,361
Claims priority, application Great Britain Nov. 11, 1961
6 Claims. (Cl. 308—187.1)

This invention relates to seals for ball and roller bearings, the latter being of the kind comprising an inner and an outer race between which the balls or rollers are located, the seals embodying a sealing medium and locating means therefor adapted to retain the grease in the bearing which is pre-packed with it.

It is known to use in conjunction with bearings (particularly for machines intended for use in out-of-door conditions) protective outer metal rings sometimes called flingers, but these have usually been separate from the bearing and held in place only by the action of assembling and securing the bearing in the machine of which it forms a part.

The object of this invention is to provide an improved construction of seal for bearings of the indicated kind which will be particularly well adapted for retaining lubricant in the bearing and protecting the latter from ingress of dirt and foreign matter and will also form a unitary structure with the bearing which is completely pre-assembled and is thereby simple to handle and install in a machine.

A seal according to the invention includes an inner annular sealing medium of labyrinth form, an annular felt or like washer behind such sealing medium and of substantially the same diameter, and an outer cover ring which is secured to one race so as to press the washer against the sealing medium and whereby the seal forms a unitary structure with the bearing. Preferably the sealing medium includes a metal or other annular reinforcement and has its axially outward face formed so as to permit the washer to rotate relative to it as well as in contact with it, and the cover ring is secured to the inner race.

The construction and arrangement of the parts of the seal may vary within the scope of the appended claims but one embodiment of the invention is illustrated by way of example in the accompanying drawings, wherein:

FIGURE 1 is a front-elevation, with the upper half shown in section, of a ball bearing fitted with seals according to this invention;

FIGURE 2 is an end view of the complete bearing and seal assembly shown in FIGURE 1;

FIGURE 3 is a section taken in an axial plane showing on an enlarged scale a portion of one of the seals and the bearing as shown in FIGURE 1;

FIGURE 4 is a similar section but on a still larger scale through the reinforced sealing medium shown in FIGURES 1 and 3; and FIGURE 5 is a composite sectional view of the three elements of the seal as shown in FIGURE 1 but axially separated.

In the illustrated embodiment there is shown a bearing having an inner race 1 and an outer race 2 and a series of balls 3, the inner race being located around the reduced ends of two adjacent hollow shafts 4, 5, while the outer race has a counterbore 6 to receive the seal which comprises three elements.

The sealing medium 7, which may be of neoprene or other synthetic rubber or of other suitable resilient material, is shown in its unstressed state in FIGURE 4. It is moulded or otherwise formed into a ring of roughly L cross section with a radially outer bulbous part 7a, an intermediate thinner part 7b and a radially inner part 7c of approximately the same thickness as that of the outer part.

An annular flanged metal ring 8 of L section is embedded in the sealing medium 7 to reinforce its radially outer part and give it axial rigidity. This ring 8 has its flange 8a extending paraxially to a line short of the axially inward face of the sealing medium and having an outer diameter greater than that of the main bore 9 of the outer race 2 so as to prevent the sealing medium from collapsing axially inwardly. The axially outward face of the sealing medium 7 is given a smooth finish so that it presents an uninterrupted surface of maximum area and minimum frictional resistance for the washer contact. This axially outward face is constituted largely by the body 8b of the reinforcing ring 8, as it will be seen that, whilst the inner periphery of this ring is just covered by the sealing medium to fix it firmly thereto, the latter has an annular recess 10 to impart increased flexibility to the part 7c.

The inner periphery of the sealing medium 7 is of labyrinth form with the lips 11 making frictional contact with the inner race 1 and preferably facing axially outwardly as illustrated so as to allow some of the pre-packed grease in the bearing to pass into an annular cavity 12 left between the inner periphery of the washer and the inner race, thus providing reserve lubrication for the washer and reducing the likelihood of back-pressure forming in the bearing. The sealing medium 7 is secured in the outer race counterbore 6 with an interference fit.

When the sealing medium 7 is inserted in the bearing, the lips 11 are displaced slightly in an axially outward direction by their pressure against the inner race as is shown in FIGURE 3.

The washer 13 is of felt or other suitable material impregnated with oil or other lubricant and fitting to the aforesaid counterbore 6 in the outer race but extending radially inwards short of the inner race, and having flat faces which allow it to rotate if it wishes to in contact with the flat outer face of the reinforced sealing medium 7.

A flinger or outer cover ring 14 of surface-hard steel (e.g. case hardened) is secured by engagement of its inwardly directed annular flange 15 with the inner race by radially outward deformation of the flange into a suitable shaped annular anchoring recess 16 in such race, leaving a clearance between the flange and the bearing seating and also between the outer periphery of the flinger and the counterbore 6 in the outer race. Other forms of security can be employed relative to the inner diameter of the inner race. For example, the flange 15 may be an interference fit within a counterbore in the inner race.

The fitting of the flinger is such that it is virtually flush with the outer race axial boundaries, being a fine running clearance in the seal recess. By reason of the flushness and case hardening of the flinger, the effects on it of windage and interference are minimised and a normal bearing boundary surface is preserved. The flinger is fitted so that it ensures retention of the felt ring, which is thus lightly supported between the opposed faces of the flinger and the sealing medium.

It will be seen that there are, in effect, two points of sealing, one where the lips 11 contact the inner race and other where the washer 13 contacts the counterbore 6 in the outer race, thus giving double protection.

By this construction the seal assembly forms a unitary structure with the bearing, making it easy to install the bearing with certainty that the seal will be correctly located and thereby ensuring the long trouble-free service for which such bearings are intended even under adverse working conditions.

The method of fitting the flinger by interference fit in the inner race counterbore may be sufficient to ensure its retention against all likely forms of attack, provided it is further secured during mounting by the shaft abutment as illustrated in FIGURE 1 and by suitable locking arrangement. This form of mounting is desirable with the seals of this invention but not necessary since independent security can be given by the deformation method of fitting the flinger to the inner race as described above.

I claim:

1. In combination with a bearing having an inner and an outer race between which rolling elements are located, a seal for retaining pre-packed lubricant in said bearing between the inner race and the outer race comprising an annular sealing medium of labyrinth form which contacts said inner race and is located axially inwardly of said outer race, a fibrous washer of substantially the same diameter as that of said sealing medium and located axially outwardly thereof, and an outer cover ring which is secured to one of said races and presses said washer against said sealing medium, thereby forming a unitary structure of seal and ring with the bearing.

2. The combination as claimed in claim 1 including an annular reinforcement which is incorporated in said sealing medium and which has its outer diameter greater than that of the main bore of said outer race, said reinforcement being constituted by a flanged ring of L section having a flange thereof extending axially inwardly to a line short of the axially inward face of said sealing medium and having a body part extending radially inwardly of said sealing medium to thereby provide the labyrinth form.

3. The combination as claimed in claim 2 and wherein the axially outward face of said sealing medium is formed of said body part of said annular reinforcement and thereby adapts said washer to rotate in contact with and relative to said axially outward face.

4. The combination as claimed in claim 1 wherein the lip edge of said labyrinth form of sealing medium makes frictional contact with said inner race along an edge which is directed slightly axially outwardly and the inner diameter of said washer is substantially less than the outer diameter of said inner race to define an annular cavity enclosed on its axially outward side by said cover ring for entry of pre-packed lubricant into said cavity past said labyrinth lips.

5. The combination as claimed in claim 1 including an inwardly directed annular flange on said cover ring which is secured to one of said races by radially outwardly deformation of said flange into an annular recess formed in said race.

6. In combination with a bearing having an inner and an outer race between which rolling elements are located, a seal assembly for retaining pre-packed lubricant in said bearing and comprising an annular resilient sealing medium of labyrinth form compressed between said inner race and a counterbore in said outer race and having a thinner radially intermediate part, an annular reinforcing ring of L section incorporated in said sealing medium and having its flange of greater diameter than that of the main bore of said outer race and extending axially inwardly to a line short of the axially inward face of said sealing medium, the body part of said reinforcing ring extending radially inwardly but so as to leave unreinforced the radially inner part of said sealing medium embodying the lips of said labyrinth formation, said body part forming the main axially outward surface of said reinforced sealing medium, a fibrous washer contacting said outward surface of said sealing medium and said counterbore in the outer race but leaving an annular cavity between its inner periphery and said inner race, and an outer cover ring having at its inner periphery an inwardly directed annular flange which is engaged by radially outward deformation of said flange into an annular recess in said inner race so as to secure the cover ring to said race and cause it to press said washer against said reinforced sealing medium with the outer periphery of said ring out of contact with said counterbore in the outer race, said seal assembly forming a unitary structure with said bearing.

References Cited in the file of this patent

FOREIGN PATENTS

| | | |
|---|---|---|
| 361,276 | Great Britain | Nov. 19, 1931 |
| 822,085 | Great Britain | Oct. 21, 1959 |
| 867,005 | Great Britain | May 3, 1961 |